United States Patent [19]

Kanai et al.

[11] Patent Number: 4,826,895

[45] Date of Patent: May 2, 1989

[54] PAINT COMPOSITION FOR UNDER COATING

[75] Inventors: Hiroshi Kanai; Joji Oka, both of Kimitsu; Hidehiko Kojo, Tokyo, all of Japan

[73] Assignees: Nippon Steel Corporation; Asahi Denka Kogyo Kabushiki Kaisha, both of Tokyo, Japan

[21] Appl. No.: 139,616

[22] Filed: Dec. 30, 1987

[30] Foreign Application Priority Data

Jan. 8, 1987 [JP] Japan ................................. 62-1013

[51] Int. Cl.$^4$ ............................................. C08K 3/36
[52] U.S. Cl. ................................. 523/443; 528/108
[58] Field of Search ................. 523/443; 528/108, 104

[56] References Cited

U.S. PATENT DOCUMENTS 4,075,153 2/1978 Leo ..................................... 523/443

FOREIGN PATENT DOCUMENTS 60-199074 10/1985 Japan .
61-152444 7/1986 Japan .
54-34406 10/1979 Japan .
53-37096 10/1978 Japan .

Primary Examiner—Lewis T. Jacobs
Attorney, Agent, or Firm—Frishauf, Holtz, Goodman & Woodward

[57] ABSTRACT

The paint composition for under coating of the present invention comprises 60 to 90% by weight of an epoxy polyol resin optionally together with a hardener therefor and 10 to 40% by weight of silica particles. Said epoxy polyol resin is obtained by reacting an optionally substituted glycidyl-etherified product of an alkylene oxide adduct of a dihydric phenol with a phosphorus acid having at least one P—OH bond, an ester or a salt thereof to thereby give a precondensate, reacting said precondensate with a dihydric phenol to give an epoxy resin of a high molecular weight, and further reacting said epoxy resin with a compound having an amino group capable of reacting with an epoxy group. Said silica particles comprise a primary particle having an average particle size of 1 to 10 m$\mu$, a surface area of 270 m$^2$/g or above and a concentration of silanol groups on the particle surface of 0.25 mM/100 m$^2$ or above.

12 Claims, No Drawings

PAINT COMPOSITION FOR UNDER COATING

BACKGROUND OF THE INVENTION

1. Field of the Invention:

This invention relates to a paint composition for under coating which is excellent in corrosion resistance, workability and adhesiveness to a substrate and to a topcoat film.

2. Description of the Prior Art:

Recently there has been an increasing need for improvement in the corrosion resistance of steel plates which are widely employed in automobiles, building materials and appliance materials. For example, the spread of ice melting compositions requires automobiles of improved corrosion resistance, while building materials should be maintenance-free for a prolonged period of time. Known processes for satisfying these requirements include, for example, plating or transforming a matrix steel or undercoating thereof. Examples of paints which have been conventionally employed in the latter method, i.e., undercoating include a composition comprising an organic binder such as rubber, phenol resin or polyester resin and a rust preventive pigment such as zinc chromate or strontium chromate; an organic/inorganic composite paint comprising colloidal silica and an aqueous organic polymer (cf. Japanese Patent Publication No. 34406/1979); an organic/inorganic composite paint having a strengthened bond between an organic resin and a silica component (cf. Japanese Patent Laid-Open No. 199074/1985); and a zinc-rich paint obtained by adding a metal powder such as a zinc powder to an organic binder (cf. Japanese Patent Publication No. 37096/1978 and Japanese Laid-Open Publication No. 152444/1986).

Paint compositions comprising an organic binder and a rust preventive pigment, which are widely employed in electric appliances or building materials, are disadvantageous in that the toxicity of a chrome pigment and the insufficient corrosion resistance thereof require thick-coating in order to achieve a high corrosion resistance, which frequently causes some troubles such as cracking or peeling of a coating film during processing. On the other hand, the corrosion resistance of composite paints comprising an organic polymer and silica is yet insufficient, though it has been considerably improved, and also the alkali resistance and adhesiveness to a topcoat film of these paints are unsatisfactory. In addition, zinc-rich paints are unsuitable to pressing since they contain relatively large metal particles, though the corrosion resistance thereof is highly improved. Thus there is no paint for under coating which satisfies all of these requirements, i.e., satisfactory corrosion resistance, workability and adhesivenss to a substrate and to a topcoat film. Therefore known paints have only limited uses.

SUMMARY OF THE INVENTION

It is an object of the present invention to provide a paint composition for under coating which is excellent in corrosion resistance, workability and adhesiveness to a substrate and to a topcoat film to thereby overcome the abovementioned problems accompanying conventional ones.

We have found that a silanol group on the surface of a silica particle is effective in improving the corrosion resistance of a paint; and that when silica particles are blended with an appropriately selected resin, the corrosion resistance of the resulting composition is remarkably elevated with a decrease in the average particle size of the primary silica particles, i.e., with an increase in the specific surface area thereof as determined by the BET method which is described in "Hyomenseki (Surface area)", Kagaku Dai-Jiten (Encyclopaedia Chimica), vol. 7, p.542, Kyoritsu Shuppan Co., Ltd. Based on these findings, we have examined the structures and molecular weights of various resins employed as a binder for a paint from various viewpoints of, for example, corrosion resistance, correlation with silica particle surface area, dispersibility of silica particles, flowability along the unevennesses on the surface of a substrate during the formation of a thin film, correlation with a substrate or a topcoat film and workability. As a result, we have found that a paint composition having a significantly improved corrosion resistance can be obtained by blending a specific epoxy polyol resin with specific silica particles, thus completing the present invention.

Accordingly the present invention has been completed by achieving the abovementioned object by providing the following paint composition for under coating (1) or (2).

(1) A solvent type paint composition for under coating which comprises the following nonvolatile components:
(a) 60 to 90% by weight of an epoxy polyol resin which is obtained by reacting an optionally substituted glycidyl-etherified product of an alkylene oxide adduct of a dihydric phenol with a phosphorus acid having at least one P—OH bond or an ester or a salt thereof to thereby give a precondensate, reacting said precondensate with a dihydric phenol to give an epoxy resin of a high molecular weight and further reacting said epoxy resin with a compound having an amino group capable of reacting with an epoxy group and
(b) 10 to 40% by weight of silica particles wherein a primary particle has an average particle size of 1 to 10 mµ, a surface area of 270 m$^2$/g or above and a silanol group concentration on the particle surface of 0.25 mM/100 m$^2$ or above (2) A solvent type paint composition for under coating which comprises the following nonvolatile components:
(a) 60 to 90% by weight, in total, of an epoxy polyol resin which is obtained by reacting an optionally substituted glycidyl-etherified product of an alkylene oxide adduct of a dihydric phenol with a phosphorus acid having at least one P—OH bond or an ester or a salt thereof to thereby give a precondensate, reacting said precondensate with a dihydric phenol to give an epoxy resin of a high molecular weight and further reacting said epoxy resin with a compound having an amino group capable of reacting with an epoxy group and a hardener for said epoxy polyol resin and
(b) 10 to 40% by weight of silica particles wherein a primary particle has an average particle size of 1 to 10 mµ, a surface area of 270 m$^2$/g or above and a silanol group concentration on the particle surface of 0.25 mM/100 m$^2$ or above.

DETAILED DESCRIPTION OF THE INVENTION

The epoxy polyol resin to be used in the present invention, which is obtained by reacting an optionally substituted glycidyl-etherified product of an alkylene oxide adduct of a dihydric phenol soluble in organic solvents with a phosphorus acid having at least one P—OH bond or an ester or a salt thereof to thereby give a precondensate, reacting this precondensate with a dihydric phenol to thereby give an epoxy resin of a high molecular weight and further reacting this epoxy resin with a compound having an amino group capable of reacting with an epoxy group, is excellent in the corrosion resistance, dispersibility of silica particles, adhesiveness to a substrate and to a topcoat film, workability and flowability during the formation of a thin film.

The term "dihydric phenol" as used herein refers to one having one or more aromatic nuclei per molecule and two hydroxyl substituents in each aromatic nucleus. Thus either mononuclear or polynuclear dihydric phenols may be employed therefor. Examples of the mononuclear dihydric phenols include resorcinol, hydroquinone, pyrocathecol, phloroglucinol, 1,5-dihydroxynaphthalene, 2,7-dihydroxynaphthalene and 2,6-dihydroxynaphthalene.

Examples of the polynuclear dihydric phenols include those represented by a general formula:

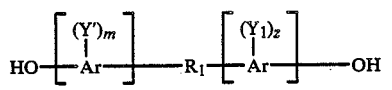 (1)

In the above formula (1), Ar represents an aromatic divalent hydrocarbon group such as a naphthylene or phenylene group. A phenylene group is preferable for the object of the present invention. Y' and $Y_1$ may be the same or different from each other and each represents an alkyl group such as a methyl, n-propyl, n-butyl, n-hexyl or n-octyl group, preferably having up to four carbon atoms; a halogen atom such as a chlorine, bromine, iodine or fluorine atom; or an alkoxy group such as a methoxy, methoxyethyl, n-butoxy or amyloxy group, preferably having up to four carbon atoms. When either one or both of these aromatic dihydric hydrocarbons have substituent(s) other than the hydroxyl groups, these substituents may be either the same or different from each other. m and z may be the same or different from each other and each represents an integer of 0 to the maximum value corresponding to the number of hydrogen atoms in each aromatic ring (Ar) capable of being substituted.

$R_1$ represents a divalent group such as

—O—, —S—, —SO— or —SO$_2$—; or a divalent hydrocarbon group, for example, an alkylene group such as a methylene, ethylene, trimethylene, tetramethylene, pentamethylene, hexamethylene, 2-ethylhexamethylene, octamethylene, nonamethylene or decamethylene group; an alkylidene group such as an ethylidene, propylidene, isopropylidene, isobutylidene, amylidene, isoamylidene or 1-phenylethylidene group; an alicyclic group such as a 1,4-cyclohexylene, 1,3-cyclohexylene or cyclohexylidene group; a halogenated alkylene group; a halogenated alkylidene group; a halogenated alicyclic group; an alkoxy- or aryloxy-substituted alkylidene group, an alkoxy- or aryloxy-substituted alkylene group or an alkoxy- or aryloxy-substituted alicyclic group such as a methoxymethylene, methoxyethylene, ethoxyethylene, 2-ethoxytrimethylene, 3-ethoxypentamethylene, 1,4-(2-methoxycyclohxxane), phenoxyethylene, 2-phenoxytrimethylene or 1,3-(2-phenoxycyclohexane) group; an alkylene group such as a phenylethylene, 2-phenyltrimethylene, 1,7-phenylpentamethylene, or 2-phenyldecamethylene group; an aromatic group such as a phenylene or naphthylene group; a halogenated aromatic group such as a 1,4-(2-chlorophenylene) or 1,4-(2-fluorphenylene) group; an alkoxy- or aryloxy-substituted aromatic group such as a 1,4-(2-methoxyphenylene), 1,4-(2-ethoxyphenylene), 1,4-(2-n-propoxyphenylene) or 1,4-(2-phenoxyphenylene) group; or an alkyl-substituted aromatic group such as a 1,4-(2-methylphenylene), 1,4-(2-ethylphenylene), 1,4-(2-n-propylphenylene) 1,4-(2-n-butylphenylene) or 1,4-(2-n-dodecylphenylene) group. Alternately, $R_1$ may be a ring fused to one of the abovementioned aromatic rings Ar, for example, in the case of the following compound:

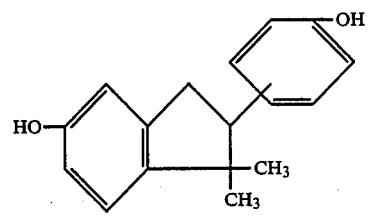

Further $R_1$ may be a polyalkoxy group such as a polyethoxy, polypropoxy, polythioethoxy, polybutoxy or polyphenylethoxy group. Furthermore $R_1$ may be a silicon-containing group such as a polydimethylsiloxy, polydiphenylsiloxy or polymethylphenylsiloxy group. Furthermore $R_1$ may represent two or more alkylene or alkylidene groups bound to each other via an aromatic ring, a tert-amino group, an ether bond, a carbonyl bond, a sulfur atom or a sulfur-containing bond such as a sulfoxide bond.

Among these polynuclear dihydric phenols, those represented by the following formula:

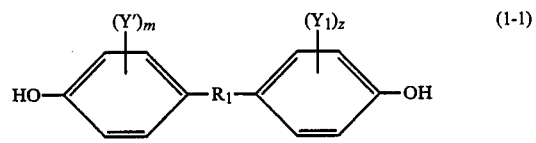 (1-1)

wherein Y' and $Y_1$ are as defined above;

m and z range each from 0 to 4; and $R_1$ represents an alkylene or alkylidene group preferably having one to three carbon atoms or a saturated group selected from among

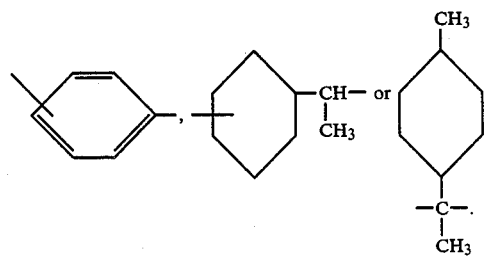

Examples of such dihydric phenols include bis(hydroxyphenyl)alkanes such as 2,2-bis(p-hydroxyphenyl)propane which is commercially available as bisphenol A, 2,4'-dihydroxydiphenylmethane, bis(2-hydroxyphenyl)methane, bis(4-hydroxyphenyl)methane, bis(4-hydroxy-2,6-dimethyl-3-methoxyphenyl)methane, 1,1-bis(4-hydroxyphenyl)ethane, 1,2-bis(4-hydroxyphenyl)ethane, 1,1-bis(4-hydroxy-2-chlorophenyl)ethane, 1,1-bis(3,5-dimethyl-4-hydroxyphenyl)ethane, 1,3-bis(3-methyl-4-hydroxyphenyl)propane, 2,2-bis(3,5-dichloro-4-hydroxyphenyl)propane, 2,2-bis(3-phenyl-4-hydroxyphenyl)propane, 2,2-bis(3-isopropyl-4-hydoxyphenyl)propane, 2,2-bis(2-isopropyl-4-hydroxyphenyl)propane, 2,2-bis(4-hydroxynaphthyl)propane, 2,2-bis(4-hydroxyphenyl)pentane, 3,3-bis(hydroxyphenyl)pentane, 2,2-bis(4-hydroxyphenyl)heptane, bis(4-hydroxyphenyl)methane, bis(4-hydroxyphenyl)cyclohexylmethane, 1,2-bis(4-hydroxyphenyl)-1,2-bis(phenyl)propane and 2,2-bis(4-hydroxyphenyl)-1-phenylpropane; dihydroxybiphenyls such as 4,4'-dihydroxybiphenyl, 2,2'-dihydroxybiphenyl and 2,4-dihydroxybiphenyl; di(hydroxyphenyl) sulfones such as bis(4-hydroxyphenyl) sulfone, 2,4'-dihydroxydiphenyl sulfone, chloro-2,4-dihydroxydiphenyl sulfone, 5-chloro-4,4'-dihydroxydiphenyl sulfone and 3'-chloro-4,4'-dihydroxydiphenyl sulfone; and di(hydroxyphenyl) ethers such as bis(4-hydroxyphenyl) ether, 4,3'-(4,2'- or 2,2'-dihydroxydiphenyl) ether, 4,4'-dihydroxy-2,6-dimethyldiphenyl ether, bis(4-hydroxy-3-isobutylphenyl) ether, bis(4-hydroxy-3-isopropylphenyl) ether, bis(4-hydroxy-3-chlorophenyl) ether, bis(4-hydroxy-3-fluorophenyl) ether, bis(4-hydroxy-3-bromophenyl) ether, bis(4-hydroxynaphthyl) ether, bis(4-hydroxy-3-chloronaphthyl) ether, bis(2-hydroxybiphenyl) ether, 4,4'-dihydroxy-2,6-dimethoxydiphenyl ether and 4,4'-dihydroxy-2,5-diethoxydiphenyl ether. In addition, 1,1-bis(4-hydroxyphenyl)-2-phenylethane, 1,3,3-trimethyl-1-(4-hydroxyphenyl)-6-hydroxyindane and 2,4-bis(p-hydroxyphenyl)-4-methylpentane are also suitable therefor. Another group of preferable polyhydric phenols includes those represented by the general formula:

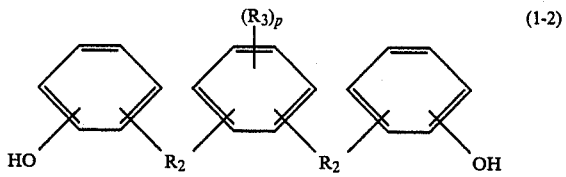

(1-2)

wherein $R_3$ represents a methyl or ethyl group; $R_2$ represents an alkylidene group having one to nine carbon atoms or another alkylene group; and p ranges from 0 to 4.

Examples thereof include 1,4-bis(4-hydroxybenzyl)benzene, 1,4-bis(4-hydroxybenzyl)tetramethylbenzene, 1,4-bis(4-hydroxybenzyl)tetraethylbenzene, 1,4-bis(p-hydroxycumyl)benzene and 1,3-bis(p-hydroxycumyl)benzene.

Other examples of the polynuclear dihydric phenol include precondensates of phenols with carbonyl compounds, such as a phenol resin precondensate, a condensate of phenol with acrolein, that of phenol with glyoxal, that of phenol with pentanedial, that of reosorcinol with acetone and a xylene/phenol/formalin precondensate; and condensates of phenols with polychloromethylated aromatic compounds such as the one obtained by condensing phenol with bischloromethylxylene.

As the alkylene oxide to be reacted with the above-mentioned dihydric phenol, those having two to four carbon atoms are employed and ethylene oxide, propylene oxide, butylene oxide and a mixture thereof are particularly preferable.

The alkylene oxide adduct of a dihydric phenol may be prepared by reacting said dihydric phenol with said alkylene oxide in the presence of an alkaline or acidic catalyst.

It is desirable that the dihydric phenol and alkylene oxide are employed in such a ratio as to give one to ten, preferably one to three, alkylene oxide molecules per hydroxyl group of the dihydric phenol.

The alkylene oxide adduct of a dihydric phenol thus obtained is then reacted with a compound selected from among epihalogenohydrins, methylepihalogenohydrins and dihalogenohydrins in the presence of an alkali hydroxide catalyst to thereby give an optionally substituted glycidyletherified product.

Examples of the epihalogenohydrin, methylepihalogenohydrin and dihalogenohydrin include epichlorohydrin, epibromohydrin, methylepichlorohydrin, methylepibromohydrin, dichlorohydrin and dibromohydrin. Among these compounds, epichlorohydrin, epibromohydrin and methylepichlorohydrin are particularly preferable.

It is preferable that the alkylene oxide adduct of a dihydric phenol and the epihalogenohydrin are employed at such a ratio as to give 1 to 20 moles of the latter per mole of the former. It is further preferable that the optionally substituted glycidyletherified compound thus obtained has an epoxy equivalent of 200 to 600.

Examples of the phorphorus acid having at least one P—OH bond include orthophosphoric acid, phosphorous acid and polyphosphoric acid, while examples of esters thereof include hydroxybutyl phosphate and 2-ethylhexyl monophosphate and examples of salts thereof include potassium phosphate, calcium phosphate and sodium phosphate.

The optionally substituted glycidyl-etherified product obtained from the alkylene oxide adduct of a dihydric phenol is reacted with a compound having at least one P—OH bond in the absence of any catalyst at a temperature of 60° to 150° C.

The ratio of the optionally substituted glycidyl-etherified product and the compound having at least one P—OH bond may be arbitrarily selected. It is particularly preferable that these materials are reacted at such a ratio as to give 0.2 to 0.4 equivalent of the P—OH group per equivalent of the epoxy group.

The precondensate thus obtained is further reacted with a dihydric phenol in the presence of a catalyst at a temperature of 80° to 250° C. to thereby give an epoxy resin of a high molecular weight. It is preferable that the high molecular weight epoxy resin thus obtained has an epoxy equivalent of 1000 to 4000.

As this dihydric phenol, anyone as cited above for the dihydric phenol in the preparation of the alkylene oxide adduct of a dihydric phenol may be employed.

Examples of the catalyst to be used in the above reaction include inorganic alkalis such as caustic soda, caustic potash and sodium carbonate; tertiary amines such as triethylamine, triethanolamine, dimethylamine and pyridine; imidazoles; quaternary ammonium salts such as tetramethylammonium chloride; and Lewis acids such as boron trifluoride, aluminum chloride, tin tetrachloride and titanium tetrachloride.

The ratio of the precondensate to the dihydric phenol may be arbitrarily determined to thereby adjust the epoxy equivalent of the high molecular weight epoxy resin to the required value.

Examples of the compound having an amino group capable of reacting with the high molecular weight epoxy resin include primary and secondary amines. Hydroxylamines having hydroxyl group(s) are particularly preferable therefor. Examples of the primary amines include methylamine, ethylamine and propylamine, while examples of the secondary amines include dibutylamine and exmaples of the hydroxylamines include ethanolamine, propanolamine, diethanolamine and diisopropanolamine.

The high molecular weight epoxy resin and the compound having an amino group may be reacted at such a ratio as to give a ratio of the epoxy group of the former to the amino group of the latter of 1.2 to 0.7, preferably 1.1 to 0.9. This reaction may be carried out without using any catalyst at a temperature of, for example, 60° to 150° C.

The epoxy polyol resin thus prepared is excellent in the corrosion resistance, silica-dispersibility, workability and adhesiveness to a substrate and to a topcoat film, regardless of its number-average molecular weight. The epoxy polyol resin of a molecular weight less than 15000 shows a particularly high corrosion resistance, while that having a molecular weight more than 1000 shows an excellent workability. When this resin is applied in the form of a film of approximately 1 μ in thickness, it is necessary that the paint is sufficiently flowable along the unevennesses on the surface of a substrate to thereby form a uniform film. The epoxy resin of a molecular weight less than 15000 has a particularly high flowability and thus readily forms a uniform film, which considerably improves the corrosion resistance thereof. Further it is necessary that silica particles can be highly dispersible in the epoxy polyol resin in order to achieve a high corrosion resistance. Namely, it is desirable that silica particles are not aggregated but homogeneously dispersed in the resin. The epoxy resin of a molecular weight less than 15000 has a high dispersibility and thus an improved corrosion resistance.

The epoxy polyol resin comprises 60 to 90% by weight of the nonvolatile component of the paint composition of the present invention. When the content of this resin is less than 60% by weight, the adhesiveness to a topcoat film and workability of the paint are lowered. On the other hand, when it exceeds 90% by weight, the effect of the incorporation of silica particles is lowered, which results in a decrease in the corrosion resistance.

The abovementioned epoxy polyol resin becomes thermosetting when blended with a hardener such as an amino resin, resol-type phenol resin or polyisocyanate resin in such an amount as to give the total content of said epoxy polyol resin and hardener of 60 to 90% by weight based on the nonvolatile components of the paint.

Examples of the amino resin include a condensate of an alkyl-etherified formaldehyde resin, such as formaldehyde or paraformaldehyde alkyl-etherifed with an alkyl alcohol having one to four carbon atoms, for example, methanol, ethanol, n-propanol, isopropanol or n-butanol with urea, N,N-ethyleneurea, dicyandiamide or aminotriazine. More particularly, methoxylated methylolurea, methoxylated methylol-N,N'-ethyleneurea, methoxylated methyloldicyandiamide, methoxylated methylolmelamine, methoxylated methylolbenzoguanamine, butoxylated methylolmelamine and butoxylated methylolbenzoguanamine may be cited.

Examples of the resol-type phenol resin include those represented by the following general formula:

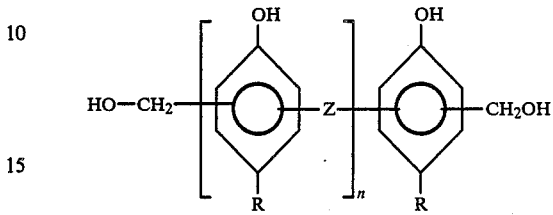

wherein
n is from 0 to 5;
z represents a group of —CH$_2$— or —CH$_2$—O—CH$_2$—; and
R represents a hydrogen atom or a group of —CH$_3$, —C(CH$_3$)$_3$,

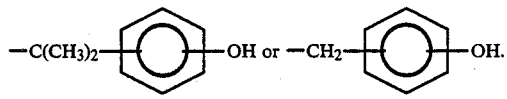

Examples of the polyisocyanate resin include compounds having two or more isocyanate groups obtained by reacting an isocyanate-containing monomer, for example, tolylene diisocyanate, xylylene diisocyanate or isophorone diisocyanate with a compound having hydroxyl group(s), wherein the isocyanate groups may be optionally blocked with, for example, phenol, methyl ethyl ketone, oxime or methanol.

In addition, a compound having at least one group capable of reacting with, for example, the hydroxyl or epoxy group of the abovementioned epoxy polyol resin may be employed as a hardener.

The hardener may be incorporated into the epoxy polyol resin at an arbitrary ratio.

In the present invention, silica particles, wherein a primary particle has an average particle size of 1 to 10 mμ, a specific surface area as determined by the BET method of 270 m$^2$/g or above and a silanol group concentration on the particle surface of 0.25 mM/100 m$^2$ or above, are employed in an amount of 10 to 40% by weight based on the nonvolatile components of the paint to thereby improve the corrosion resistance of the paint. When the average particle size of the primary particle thereof is not more than 1 mμ, the alkali resistance of the paint becomes undesirably low. On the other hand, when it exceeds 10 mμ, the effect of improving the corrosion resistance is lowered. Therefore the average particle size of the primary particle should fall within a range of 1 to 10 mμ.

Silanol groups on the surface of silica particles considerably contribute to the improvement in the corrosion resistance. Thus silica particles, which have been surface-treated with, for example, a silane coupling agent to thereby lower the silanol group concentration on the surface thereof, bring about a reduced improvement in the corrosion resistance when incorporated into the above epoxy polyol resin. Commercially available untreated fumed silica, wherein the average particle size of a primary particle is 7 mμ, shows a silanol density on the surface of approximately 0.3 to 0.6 mM/100 m². When the silanol group density is lower than 0.25 mM/100 m², a decrease in the corrosion resistance is observed. When the specific surface area of silica particles as determined by the BET method is smaller than 270 m²/g, a decrease in the corrosion resistance is similarly observed. From the viewpoint of workability, silica particles having a specific surface area of 800 m²/g or below are preferable. Accordingly the silica particles to be employed in the present invention should have an average particle size of a primary particle of 1 to 10 mμ, a specific surface area as determined by the BET method of 270 m²/g or above and a silanol group concentration on the surface of 0.25 mM/100 m² or above, preferably less than 1.0 mM/100 m² from the viewpoint of workability.

Examples of such silica particles include fumed silica and colloidal silica particles. Fumed silica is particularly preferable. This is because colloidal silica dispersible in water can be hardly miscible with the epoxy polyol resin soluble in organic solvents, while that dispersible in methanol can not be blended with a large amount of the epoxy polyol resin which is not always highly soluble in methanol; and that colloidal silica contains ammonium or alkali metal ion(s) as stabilizer(s) which would lower the corrosion resistance of a coating film. Examples of the fumed silica include Aerosil 300 and Aerosil 380, both available from DEGUSSA. The silica particles may be incorporated in an amount of 10 to 40% by weight, preferably 15 to 25% by weight, based on the nonvolatile components of the paint. When the content thereof is less than 10% by weight, the aimed effect of improving the corrosion resistance can not be achieved. On the other hand, when it exceeds 40% by weight, the workability, alkali resistance and adhesiveness to a topcoat film are lowered.

The composition of the present invention as defined above may further contain synthetic resins, organic or inorganic pigments and extender pigments other than those as cited above, as well as various additives and solvents conventionally employed in the art. Examples of the additives include dispersants, anti-settling agents and leveling agents while those of the solvents include various hydrocarbons, esters, ketones, alcohols and amides. The formulation of the paint composition may be carried out according to a conventional process for the preparation of a solvent type paint.

The paint composition for under coating of the present invention is highly useful as an under coating paint composition for steel plates for automobiles, building materials and domestic electric appliances. The base material for these steel plates include hot-dip zinc coated plate, hot-dip zinc/aluminum coated plate, zinc electroplated plate, zinc/nickel alloy or zinc/iron alloy electroplated plate, zinc/iron two-layer electroplated plate and cold-rolled plate. The surfaces of these base materials may be cleaned by, for example, alkaline degreasing if required, optionally subjected to conventional pretreatment(s) and then coated with the paint composition of the present invention. Examples of the pretreatments include chromating such as electrolytic chromating, coating chromating or reactive chromating and phosphating with the use of, for example, zinc phosphate.

The paint composition of the present invention may be applied by an appropriate method selected from among, for example, spraying, roll coating and shower coating and then dried to thereby form a film. Baking at a temperature of 100° to 250° C. is particularly preferable. The film formed by baking may be used as such. Alternately a topcoat paint such as an acryl resin, urethane resin, polyester resin, fluororesin or electrodeposition coating may be further applied thereon. The paint composition of the present invention can exert the aimed effects when applied in the form of a film as thin as approximately 1 μ, although it may be applied to give a more thick film without any limitation.

To further illustrate the present invention, the following Examples will be given wherein all parts are expressed by weight.

The resins and silica particles employed in the following Examples and Comparative Examples are as follows.

(1) Epoxy resin (a) Epoxy resins within the scope of the present invention

Epoxy polyol resin A: number-average molecular weight of 5200 and hydroxyl equivalent of 360. Prepared by the following method.

Ethylene oxide was added to bisphenol A to give a glycidyl-etherified liquid epoxy resin having an epoxy equivalent of 410. 150 parts of this epoxy resin was mixed with 10 parts of monoethyl phosphate and the mixture was allowed to react at 90° C. for four hours under stirring to thereby give a precondensate (I). To 200 parts of this precondensate (I) were added 20 parts of bisphenol A and sodium hydroxide as a catalyst, and the mixture was heated to 200° C. for six hours under stirring. The high molecular weight epoxy resin thus obtained had an epoxy equivalent of 2700. Then 9 parts of diethanolamine was further added thereto and the mixture was heated to 100° C. for three hours under stirring. Thus an epoxy polyol resin A was obtained.

Epoxy polyol resin B: number-average molecular weight of 2500 and hydroxyl equivalent of 490. Prepared by the following method.

Propylene oxide was added to bisphenol F to give a glycidyl-etherified liquid epoxy resin having an epoxy equivalent of 300. 150 parts of this epoxy resin was mixed with 15 parts of dibasic potassium phosphate and the mixture was allowed to react at 100° C. for six hours to thereby give a precondensate (II).

To 300 parts of this precondensate (II) were added 50 parts of bisphenol F and dimethylamine as a catalyst, and the mixture was heated to 150° C. for eight hours under stirring. The high molecular weight epoxy resin thus obtained had an epoxy equivalent of 1300. Then 35 parts of dibutylamine was further added thereto and the mixture was stirred at 100° C. for three hours. Thus an epoxy polyol resin B was obtained.

Epoxy polyol resin C: number-average molecular weight of 6500 and hydroxyl equivalent of 450. Prepared by the following method.

Propylene oxide was added to bisphenol A to give a glycidyl-etherified liquid epoxy resin having an epoxy equivalent of 520. 200 parts of this epoxy resin was mixed with 6 parts of orthophosphoric acid and the mixture was allowed to react at 80° C. for five hours under stirring to thereby give a precondensate (III). To 200 parts of this precondensate (III) were added 14 parts of bisphenol F and potassium hydroxide as a catalyst, and the mixture was heated to 180° C. for six hours under stirring. The high molecular weight epoxy resin thus obtained had an epoxy equivalent of 3800. Then 8 parts of diisopropanolamine was further added thereto and the mixture was heated to 100° C. for three hours under stirring. Thus an epoxy polyol resin C was obtained.

Epoxy polyol resin D: number-average molecular weight of 17000 and hydroxyl equivalent of 400. Prepared by the following method.

Ethylene oxide was added to bisphenol A to give a glycidyl-etherified liquid epoxy resin having an epoxy equivalent of 410. 150 parts of this epoxy resin was mixed with 10 parts of monoethyl phosphate and the mixture was allowed to react at 90° C. for four hours under stirring to thereby give a precondensate (IV). To 200 parts of this precondensate (IV) were added 29 parts of bisphenol A and potassium hydroxide as a catalyst, and the mixture was heated to 180° C. for nine hours under stirring. The high molecular weight epoxy resin thus obtained had an epoxy equivalent of 30000. Then 1 part of diethanolamine was further added thereto and the mixture was heated to 120° C. for three hours under stirring. Thus an epoxy polyol resin D was obtained.

(b) Epoxy resins out of the scope of the present invention

Epoxy polyol resin X: number-average molecular weight of 5000 and hydroxyl equivalent on a solid basis of 300. Prepared by the following method.

To 150 parts of bisphenol A diglycydyl ether having an epoxy equivalentof 480 were added 27 parts of bisphenol A and sodium hydroxide as a catalyst, and the mixture was stirred at 180° C. for five hours.

The high molecular weight epoxy resin thus obtained had an epoxy equivalent of 2700. Then 25 parts of xylene, 25 parts of methyl isobutyl ketone and 8 parts of diethanolamine were further added thereto and the mixture was stirred at 90° C. for three hours. Thus a polyol resin X was obtained.

(2) Hardener

Each hardener as shown below falls within the scope of the present invention.
Butylated melamine resin: Melan 2000, mfd. by Hitachi Chemical Co., Ltd.
Blocked polyisocyanate resin:
Takenate B-846N, mfd. by Takeda Chemical Industries Ltd., effective NCO %: 8.5%

(3) Silica particles

The silica particles as used in the Examples and Comparative Examples are the following ones which are each a fumed silica product obtained from DEGUSSA.

| Property | Tradename | | |
|---|---|---|---|
| | Aerosil 300 | Aerosil* R976 | Aerosil OX-50 |
| Average particle size of primary particle (mμ) | 7 | 7 | 40 |
| Specific surface area determined by the BET method (m²/g) | 300 | 270 | 50 |
| Silanol group density (mM/100 m²) | 0.4 | 0.1 | 0.5 |

*Surface-treated with dimethylchlorosilane.

Aerosil 300 falls within the scope of the present invention while the other two are out of the same.

The Examples and Comparative Examples were carried out in the following manner.

(1) Preparation of paint

To an epoxy polyol resin or epoxy resin, a hardener was optionally added. Then fumed silica and a solvent mixture of xylene and cyclohexanone at a weight ratio of 1:1 were further added thereto and the resulting mixture was thoroughly stirred. Thus a paint composition comprising 20% by weight of nonvolatile components was obtained. The composition of the nonvolatile components of each paint as obtained in the Examples and Comparative Examples is shown in Table 1 wherein each part is expressed by weight on a solid basis.

(2) Preparation of test plate

A cold-rolled steel plate (SPKD, 0.8 mm in thickness) was preliminarily electroplated with a Zn/Ni alloy containing 11% of Ni at an application rate of 20 g/m² and then subjected to electrolytic chromating at an application rate of 40 mg Cr/m². The base material thus obtained was then coated with each composition of the Examples and Comparative Examples by roll-coating and baked at 200° C. for 30 minutes to thereby form a dry film of 1 μ in thickness.

(3) Evaluation items and methods therefor

Corrosion resistance: According to the method as stipulated in JIS K 5400 7.8, a salt spray test was conducted on each test plate continuously for 240 hours to determine the ratio (%) of white rust area on the cross-cut part. In Table 1, (R) refers to red rust.

Adhesiveness: According to the method as stipulated in JIS K 5400 6.15, a cellophane adhesive tape was applied onto each test plate to thereby evaluate the adhesiveness of the paint to the substrate.

Bending workability: A 1 T bending test was performed to evaluate cracking and peeling of the film at the bending part according to the following criteria:
O: normal;
Δ: cracking but no peeling; and
x: peeling.

Alkali resistance: Each coated plate was immersed in an aqueous solution of NaOH (pH 13) at 60° C. for two hours and the weight loss caused thereby was determined, thus evaluating the dissolution of the paint film according to the following criteria:
O: weight loss less than 5%,
Δ: weight loss within 5% to 30%; and
x: weight loss exceeding 30%.

Adhesiveness to topcoat film: After forming an undercoat film on each plate by baking, a cationic electrodeposition paint (Power Top U-100; mfd. by Nippon Paint Co., Ltd.) was applied thereon by electrodeposition while impressing a DC voltage of 210 V for three minutes at a bath temperature of 28° to 30° C., followed by baking at 170° C. for 30 minutes to thereby give a film of 20 μ in thickness. Subsequently the obtained plate was immersed in water at 40° C. for 240 hours and then allowed to stand at room temperature for 24 hours. Subsequently the adhesiveness was evaluated according to the method as described in Note 2.

Table 1 shows the composition of the nonvolatile components and the evaluation results of each paint obtained in Examples 1 to 8 and Comparative Examples 1 to 6.

TABLE 1

| | | Example | | | | | | | | Comparative Example | | | | | |
|---|---|---|---|---|---|---|---|---|---|---|---|---|---|---|---|
| | | 1 | 2 | 3 | 4 | 5 | 6 | 7 | 8 | 1 | 2 | 3 | 4 | 5 | 6 |
| Epoxy polyol resin A (parts) | | 72 | 64 | | | | | | | 80 | 43 | | | | |
| Epoxy polyol resin B (parts) | | | | 68 | 60 | 50 | | | | | | | 68 | 68 | 85 |
| Epoxy polyol resin C (parts) | | | | | | | 68 | 80 | | | | | | | |
| Epoxy polyol resin D (parts) | | | | | | | | | 80 | | | | | | |
| Epoxy polyol resin X (parts) | | | | | | | | | | | | 60 | | | |
| Butylated melamine resin | (parts) | 13 | 11 | 12 | 10 | | 12 | | | 15 | 7 | 10 | 12 | 12 | 15 |
| Blocked polyisocyanate resin | (parts) | | | | | 30 | | | | | | | | | |
| Aerosil 300 | (parts) | 15 | 25 | 20 | 30 | 20 | 20 | 20 | 20 | 5 | 50 | 30 | | | |
| Aerosil R976 | (parts) | | | | | | | | | | | | 20 | | |
| Aerosil OX-50 | (parts) | | | | | | | | | | | | | 20 | |
| Corrosion resistance | (Note 1) | 2 | 1 | 2 | 0 | 3 | 5 | 2 | 10 | 95 | 35 | 100 | 75 | 100(R) | 100(R) |
| Adhesiveness | (Note 2) | 100/100 | 100/100 | 100/100 | 100/100 | 100/100 | 100/100 | 100/100 | 100/100 | 100/100 | 90/100 | 100/100 | 100/100 | 100/100 | 100/100 |
| Bending workability | (Note 3) | O | O | O | O | O | O | O | O | O | X | Δ | O | O | O |
| Alkali resistance | (Note 4) | O | O | O | O | O | O | O | O | O | X | O | O | O | O |
| Adhesiveness to topcoat film | (Note 5) | 100/100 | 100/100 | 100/100 | 100/100 | 100/100 | 100/100 | 100/100 | 100/100 | 100/100 | 40/100 | 100/100 | 100/100 | 100/100 | 100/100 |

Now the Examples and Comparative Examples will be described in detail. The paint compositions of Examples 1 to 7 are epoxy polyol resins each having a number-average molecular weight of 2500 to 6500 and falling within the scope of the appended claim 3. The compositions of Examples 1 to 4 and 6 contain a butylmelamine resin while that of Example 5 contains a blocked polyisocyanate resin each as a hardener. In contrast thereto, that of Example 7 contains no hardener. The composition of Example 8 having a number-average molecular weight of 17,000 is out of the scope of the appended claim 3 but falls within those of the claims 1 and 2. This composition contains no hardener. These compositions contain 15 to 30% by weight of Aerosil 300, which falls within the scope of the present invention as silica particles, in the nonvolatile components. Each composition is excellent in the corrosion resistance, adhesiveness, bending workability, alkali resistance and adhesiveness to a topcoat film. Those having a number-average molecular weight less than 1500, i.e., the compositions of Examples 1 to 7 are particularly superior in the corrosion resistance.

In contrast thereto, the composition of Comparative Example 1 comprising silica particles in an amount below the lower limit as defined in the present invention shows a poor corrosion resistance, while that of Comparative Example 2 comprising silica particles in an amount exceeding the upper limit as defined therein is inferior in every item. The composition of Example 3 comprising an epoxy resin whose structure is out of the scope of the present invention is obviously inferior in the corrosion resistance and bending workability to that of Example 4 which comprises the same butylated melamine resin and silica particles each in the same amount. The compositions of Comparative Examples 4 and 5 comprising silica particles out of the scope of the present invention are extremely inferior in the corrosion resistance to that of Example 3 which comprises the same epoxy polyol resin and the same amount of the butylated melamine resin. The composition of Comparative Example 6 comprising no silica particle is inferior in the corrosion resistance to those of the present invention. These results suggest that the combined use of an epoxy resin and silica particles, as proposed by the present invention, exhibits a remarkable effect of improving the corrosion resistance of a paint composition.

As described above, the paint composition for under coating of the present invention, which comprises an appropriately selected combination of silica particles and a resin, shows a high corrosion resistance which has never been expected in the prior arts as well as excellent adhesiveness to a substrate, workability and adhesiveness to a topcoat film.

What is claimed is:

1. A solvent type paint composition for under coating which comprises the following nonvolatile components:
   (a) 60 to 90% by weight of an epoxy polyol resin which is obtained by reacting an optionally substituted glycidyl-etherified product of an alkylene oxide adduct of a dihydric phenol with a phosphorus acid having at least one P—OH bond or an ester or a salt thereof to thereby give a precondensate, reacting said precondensate with a dihydric phenol to give an epoxy resin of a high molecular weight, and further reacting said epoxy resin with a compound having an amino group capable of reacting with an epoxy group, and
   (b) 10 to 40% by weight of silica particles wherein a primary particle has an average particle size of 1 to 10 mμ, a surface area of 270 m²/g or above and a silanol group concentration on the particle surface of 0.25 mM/100 m² or above.

2. A paint composition as set forth in claim 1, wherein said epoxy polyol resin has a number-average molecular weight of 1000 to 15,000.

3. A paint composition as set forth in claim 1, wherein said optionally substituted glycidyl-etherified product has an epoxy equivalent of 200 to 600.

4. A paint composition as set forth in claim 1, wherein said phosphorus acid having at least one P—OH bond is selected from the group consisting of orthophosphoric acid, phosphorous acid and polyphosphoric acid.

5. A paint composition as set forth in claim 1, wherein said ester of phosphorus acid is selected from the group consisting of hydroxybutyl phosphate and 2-ethylhexyl monophosphate.

6. A paint composition as set forth in claim 1, wherein said salt of phosphorus acid is selected from the group consisting of potassium phosphate, calcium phosphate and sodium phosphate.

7. A paint composition as set forth in claim 1, wherein said epoxy resin of a high molecular weight has an epoxy equivalent of 1000 to 4000.

8. A paint composition as set forth in claim 1, wherein said compound having an amino group capable of reacting with an epoxy group is a hydroxylamine.

9. A paint composition as set forth in claim 1, wherein said silica particles are fumed silica.

10. A solvent type paint composition for under coating which comprises the following nonvolatile components:
(a) 60 to 90% by weight, in total, of an epoxy polyol resin which is obtained by reacting an optionally substituted glycidyl-etherified product of an alkylene oxide adduct of a dihydric phenol with a phosphorus acid having at least one P—OH bond or an ester or a salt thereof to thereby give a precondensate, reacting said precondensate with a dihydric phenol to give an epoxy resin of a high molecular weight, and further reacting said epoxy resin with a compound having an amino group capable of reacting with an epoxy group, and a hardener for said epoxy polyol resin, and
(b) 10 to 40% by weight of silica particles wherein a primary particle has an average particle size of 1 to 10 m$\mu$, a surface area of 270 m$^2$/g or above and a silanol group concentration on th particle surface of 0.25 mM/100 m$^2$ or above.

11. A paint composition as set forth in claim 10, wherein said epoxy polyol resin has a number-average molecular weight of 1000 to 15,000.

12. A paint composition as set forth in claim 10, wherein said hardener for said epoxy polyol resin is selected from the group consisting of amino resins, resol-type phenol resins and polyisocyanate resins.

* * * * *